United States Patent
Howard

(10) Patent No.: US 9,555,903 B2
(45) Date of Patent: Jan. 31, 2017

(54) METHOD FOR DIAGNOSING A BLEED AIR SYSTEM FAULT

(71) Applicant: GE Aviation Systems Limited, Cheltenham (GB)

(72) Inventor: Julia Ann Howard, Lee-On-The-Solent (GB)

(73) Assignee: GE AVIATION SYSTEMS LIMITED, Cheltenham (GB)

( * ) Notice: Subject to any disclaimer, the term of this patent is extended or adjusted under 35 U.S.C. 154(b) by 85 days.

(21) Appl. No.: 14/276,007

(22) Filed: May 13, 2014

(65) Prior Publication Data

US 2014/0336872 A1    Nov. 13, 2014

(30) Foreign Application Priority Data

May 13, 2013   (GB) .................................. 13085097

(51) Int. Cl.

| B64F 5/00 | (2006.01) |
|---|---|
| F02C 6/06 | (2006.01) |
| F02C 6/08 | (2006.01) |
| F02C 7/18 | (2006.01) |
| F02C 9/18 | (2006.01) |

(52) U.S. Cl.
CPC .............. *B64F 5/0045* (2013.01); *F02C 6/06* (2013.01); *F02C 6/08* (2013.01); *F02C 7/18* (2013.01); *F02C 9/18* (2013.01); *F05D 2260/213* (2013.01); *F05D 2270/09* (2013.01); *F05D 2270/303* (2013.01)

(58) Field of Classification Search
CPC ............. B64F 5/0045; F02C 6/08; F02C 9/00; F05D 2270/44; F05D 2260/80
See application file for complete search history.

(56) References Cited

U.S. PATENT DOCUMENTS

| 3,839,860 | A | * | 10/1974 | Martin ..................... F02C 9/42 60/224 |
|---|---|---|---|---|
| 4,954,974 | A | * | 9/1990 | Howell, IV ........... F01D 21/003 340/945 |
| 6,502,085 | B1 | | 12/2002 | Adibhatla et al. |
| 6,676,504 | B2 | | 1/2004 | Petri et al. |
| 6,737,988 | B2 | | 5/2004 | Horner et al. |
| 8,298,055 | B2 | | 10/2012 | Schiek |

(Continued)

FOREIGN PATENT DOCUMENTS

| CN | 1386103 A | 12/2002 |
|---|---|---|
| CN | 101365625 A | 2/2009 |

(Continued)

OTHER PUBLICATIONS

British Search Report for Counterpart GB1308509.7, Nov. 13, 2013.

(Continued)

*Primary Examiner* — John Q Nguyen
*Assistant Examiner* — Jordan S. Fei
(74) *Attorney, Agent, or Firm* — GE Global Patent Operation; William S. Munnerlyn

(57) ABSTRACT

A method of diagnosing a bleed air system fault, where the method includes receiving a sensor signal from the at least one of the bleed air system sensor to define a sensor output, comparing the sensor output to a reference value, and diagnosing a fault in the bleed air system based on the comparison.

8 Claims, 3 Drawing Sheets

(56) References Cited

U.S. PATENT DOCUMENTS

| | | |
|---|---|---|
| 9,008,866 B2 | 4/2015 | Feau |
| 2002/0125414 A1 | 9/2002 | Dammann |
| 2002/0138184 A1* | 9/2002 | Kipersztok ........ G05B 23/0278 701/32.9 |
| 2002/0139180 A1* | 10/2002 | Xiong ................... F01D 17/105 73/112.05 |
| 2004/0139751 A1* | 7/2004 | Liu ........................ B64D 13/00 60/782 |
| 2005/0222747 A1 | 10/2005 | Vhora et al. |
| 2007/0234734 A1* | 10/2007 | Uluyol ...................... F02C 7/26 60/778 |
| 2008/0312783 A1 | 12/2008 | Mansouri et al. |
| 2010/0147399 A1* | 6/2010 | Buhring ................. B64D 13/06 137/468 |
| 2010/0158068 A1* | 6/2010 | Monteiro ............... B64D 13/00 374/4 |
| 2010/0312420 A1 | 12/2010 | Sham et al. |
| 2011/0040470 A1* | 2/2011 | Qiu ........................ F01D 19/00 701/100 |
| 2011/0201262 A1 | 8/2011 | Lehmann |
| 2011/0276832 A1 | 11/2011 | Schneider et al. |
| 2011/0289138 A1 | 11/2011 | Turakhia |
| 2012/0287960 A1* | 11/2012 | Thompson ............. B64D 13/00 374/4 |
| 2012/0330495 A1* | 12/2012 | Geib ..................... F01D 21/003 701/29.6 |
| 2013/0179028 A1* | 7/2013 | Gu .......................... G06F 17/00 701/29.4 |
| 2014/0309846 A1 | 10/2014 | Howard |

FOREIGN PATENT DOCUMENTS

| | | |
|---|---|---|
| CN | 102026869 A | 4/2011 |
| CN | 102301296 A | 12/2011 |
| CN | 202582786 U | 12/2012 |
| CN | 104108474 A | 10/2014 |
| EP | 2149832 A2 | 2/2010 |
| GB | 2378248 A | 2/2003 |
| JP | 05139392 A | 6/1993 |
| JP | 0796897 A | 4/1995 |
| JP | 11222198 A | 8/1999 |
| JP | 2005518307 A | 6/2005 |
| JP | 2006273183 A | 10/2006 |
| WO | 8502906 A1 | 7/1985 |

OTHER PUBLICATIONS

Unofficial English Translation of Japanese Office Action issued in connection with corresponding JP Application No. 2014096418 on Apr. 7, 2015.

Office Action issued in connection with corresponding CA Application No. 2,851,014 on Mar. 17, 2015.

Unofficial English translation of Office Action issued in connection with corresponding CN Application No. 201410201531.7 on Sep. 17, 2015.

CN office action issued Jun. 7, 2016 in connection to corresponding CN Application 201410201531.7.

\* cited by examiner

METHOD FOR DIAGNOSING A BLEED AIR SYSTEM FAULT

CROSS-REFERENCE TO RELATED APPLICATIONS

This application claims priority under 35 U.S.C. §119 to British Patent Application No. 13085097, filed May 13, 2013, the disclosure of which is incorporated herein by reference in its entirety.

BACKGROUND OF THE INVENTION

Contemporary aircraft include bleed air systems that take hot air from the engines of the aircraft for use in other systems on the aircraft including air conditioning and pressurization. Currently, airlines and maintenance personnel wait until a fault or problem occurs with the system and then attempt to identify the cause and fix it either during scheduled or, more likely, unscheduled maintenance. Fault occurrences are also recorded manually based on pilot discretion.

BRIEF DESCRIPTION OF THE INVENTION

In one embodiment, the invention relates to a method of diagnosing a bleed air system fault in an aircraft having an engine operably coupled to a bleed air system including at least one valve, at least one bleed air system sensor, the method includes receiving a sensor signal from the at least one of the bleed air system sensor to define a sensor output, comparing the sensor output to a reference value for the sensor output, diagnosing a fault in the bleed air system based on the comparison, and providing an indication of the diagnosed fault.

DESCRIPTION OF EMBODIMENTS OF THE INVENTION

Figure 1:
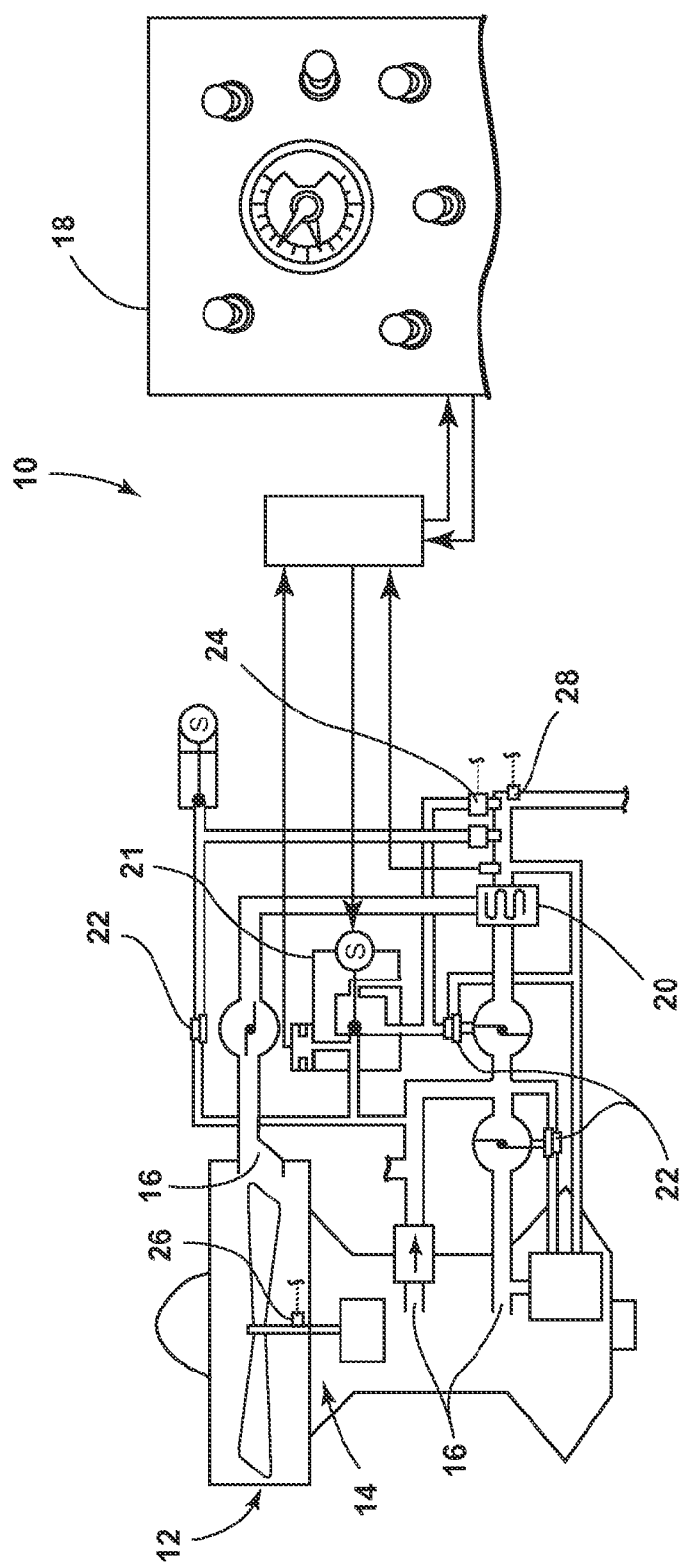
FIG. 1 is a schematic view of a portion of an exemplary bleed air system.

FIG. 1 schematically depicts a portion of a bleed air system 10, which is connected to an engine 12 having a fan 14, such as a turbofan jet engine. Various bleed ports 16 may be connected to various portions of the engine 12 to provide highly compressed air to the bleed air system 10. A control mechanism 18 may be utilized to control the bleed air system 10. Various components may be included in the bleed air system 10 including a pre-cooler 20, bleed air regulator 21, various valves 22 including a pre-cooler control valve (PCCV), and various sensors including, for example, a temperature sensor 24, a fan speed sensor 26, and a pressure sensor 28. In the illustrated example, the temperature sensor 24 and the pressure sensor 28 are located after the PCCV. While only a single temperature sensor 24 and pressure sensor 28 have been illustrated it will be understood that any number of sensors may be included in the bleed air system 10 including that the sensors may be included at various stages in the bleed air system 10. Further, sensors may be included to output various parameters including binary flags for indicating valve settings and/or positions including for example the state of the valve (e.g. fully open, open, in transition, close, fully closed); binary flags may also indicate a number of other items for example if a leak has been detected from the air system on the wing or if a temperature or pressure has been calculated by the aircraft to have exceeded a limit on a single occasion or multiple times over a specified time/data period. It is possible these data flags might be available from points in the system where continuous data is not currently available.

Figure 2:
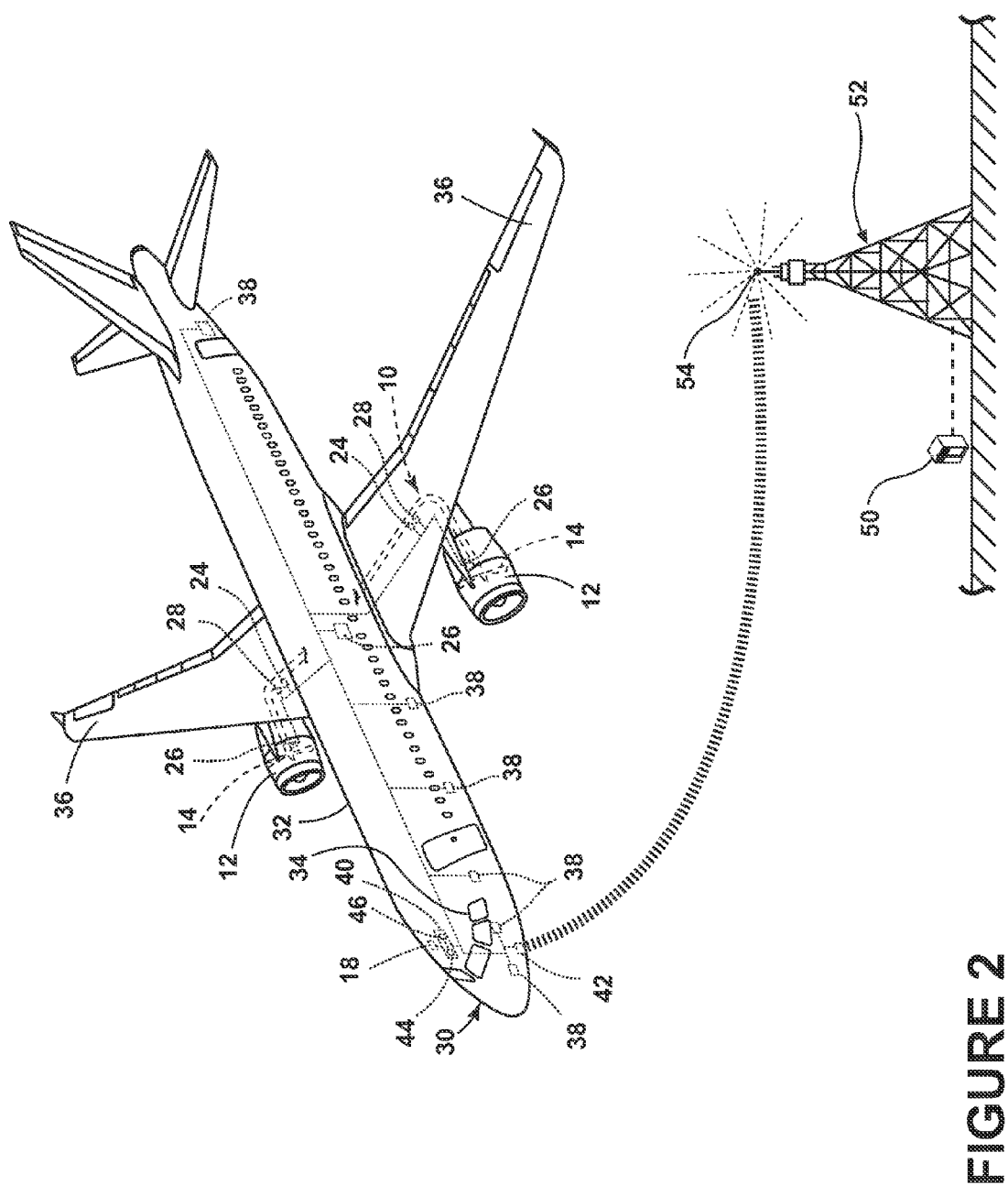
FIG. 2 is a perspective view of an aircraft and a ground system in which embodiments of the invention may be implemented.

FIG. 2 illustrates an aircraft 30 that may include the bleed air system 10, only a portion of which has been illustrated for clarity purposes, and may execute embodiments of the invention. As illustrated the aircraft 30 may include multiple engines 12 coupled to a fuselage 32, a cockpit 34 positioned in the fuselage 32, and wing assemblies 36 extending outward from the fuselage 32. The control mechanism 18 has been illustrated as being included in the cockpit 34 and may be operated by a pilot located therein.

A plurality of additional aircraft systems 38 that enable proper operation of the aircraft 30 may also be included in the aircraft 30 as well as a controller 40, and a communication system having a wireless communication link 42. The controller 40 may be operably coupled to the plurality of aircraft systems 38 including the bleed air system 10. For example, the pre-cooler 20 (FIG. 1), bleed air regulator 21 (FIG. 1), various valves 22 (FIG. 1), a temperature sensor 24, fan speed sensor 26, and pressure sensor 28 may be operably coupled to the controller 40.

The controller 40 may also be connected with other controllers of the aircraft 30. The controller 40 may include memory 44, the memory 44 may include random access memory (RAM), read-only memory (ROM), flash memory, or one or more different types of portable electronic memory, such as discs, DVDs, CD-ROMs, etc., or any suitable combination of these types of memory. The controller 40 may include one or more processors 46, which may be running any suitable programs. The controller 40 may be a portion of an FMS or may be operably coupled to the FMS.

A computer searchable database of information may be stored in the memory 44 and accessible by the processor 46. The processor 46 may run a set of executable instructions to display the database or access the database. Alternatively, the controller 40 may be operably coupled to a database of information. For example, such a database may be stored on an alternative computer or controller. It will be understood that the database may be any suitable database, including a single database having multiple sets of data, multiple discrete databases linked together, or even a simple table of data. It is contemplated that the database may incorporate a number of databases or that the database may actually be a number of separate databases.

The database may store data that may include historical data related to the reference value for the sensor outputs as well as historical bleed air system data for the aircraft 30 and related to a fleet of aircraft. The database may also include reference values including historic values or aggregated values.

Alternatively, it is contemplated that the database may be separate from the controller 40 but may be in communication with the controller 40 such that it may be accessed by the controller 40. For example, it is contemplated that the database may be contained on a portable memory device and in such a case, the aircraft 30 may include a port for receiving the portable memory device and such a port would be in electronic communication with controller 40 such that controller 40 may be able to read the contents of the portable memory device. It is also contemplated that the database may be updated through the wireless communication link 42 and that in this manner, real time information may be included in the database and may be accessed by the controller 40.

Further, it is contemplated that such a database may be located off the aircraft 30 at a location such as an airline operation center, flight operations department control, or another location. The controller 40 may be operably coupled to a wireless network over which the database information may be provided to the controller 40.

While a commercial aircraft has been illustrated, it is contemplated that portions of the embodiments of the invention may be implemented anywhere including in a controller or computer 50 at a ground system 52. Furthermore, the database(s) as described above may also be located in a destination server or a computer 50, which may be located at and include the designated ground system 52. Alternatively, the database may be located at an alternative ground location. The ground system 52 may communicate with other devices including the controller 40 and databases located remote from the computer 50 via a wireless communication link 54. The ground system 52 may be any type of communicating ground system 52 such as an airline control or flight operations department.

One of the controller 40 and the computer 50 may include all or a portion of a computer program having an executable instruction set for diagnosing a bleed air system fault in the aircraft 30. Such diagnosed faults may include improper operation of components as well as failure of components. As used herein the term diagnosing refers to a determination after the fault has occurred and contrasts with prediction, which refers to a forward looking determination that makes the fault known in advance of when the fault occurs. Along with diagnosing the controller 30 and/or the computer 40 may detect the fault. Regardless of whether the controller 40 or the computer 50 runs the program for diagnosing the fault, the program may include a computer program product that may include machine-readable media for carrying or having machine-executable instructions or data structures stored thereon. Such machine-readable media may be any available media, which can be accessed by a general purpose or special purpose computer or other machine with a processor. Generally, such a computer program may include routines, programs, objects, components, data structures, algorithms, etc. that have the technical effect of performing particular tasks or implementing particular abstract data types. Machine-executable instructions, associated data structures, and programs represent examples of program code for executing the exchange of information as disclosed herein. Machine-executable instructions may include, for example, instructions and data, which cause a general purpose computer, special purpose computer, or special purpose processing machine to perform a certain function or group of functions.

It will be understood that the aircraft 30 and the computer 50 merely represent two exemplary embodiments that may be configured to implement embodiments or portions of embodiments of the invention. During operation, either the aircraft 30 and/or the computer 50 may diagnose a bleed air system fault. By way of non-limiting example, while the aircraft 30 is being operated the control mechanism 18 may be utilized to operate the bleed air system 10. Sensors including the temperature sensor 24, fan speed sensor 26, and pressure sensor 28 may output data relevant to various characteristics of the bleed air system 10. The controller 40 and/or the computer 50 may utilize inputs from the control mechanism 18, the temperature sensor 24, fan speed sensor 26, pressure sensor 28, aircraft systems 38, the database(s), and/or information from airline control or flight operations department to diagnose the bleed air system fault or detect a fault that the airline maintenance crew were previously unaware of. Among other things, the controller 40 and/or the computer 50 may analyze the data output by the temperature sensor 24, fan speed sensor 26, and pressure sensor 28 over time to determine drifts, trends, steps, or spikes in the operation of the bleed air system 10. The controller 40 and/or the computer 50 may also analyze the bleed air system data to determine historic pressures, historic temperatures, pressure differences between the two engines on the aircraft 30, temperature differences between two engines on the aircraft 30, etc. and to diagnose faults in the bleed air system 10 based thereon. Once a bleed air system fault has been diagnosed an indication may be provided on the aircraft 30 and/or at the ground system 52. It is contemplated that the diagnosis of the bleed air system fault may be done during flight, may be done post flight, or may be done after any number of flights. The wireless communication link 42 and the wireless communication link 54 may both be utilized to transmit data such that the fault may be diagnosed by either the controller 40 and/or the computer 50.

Figure 3:
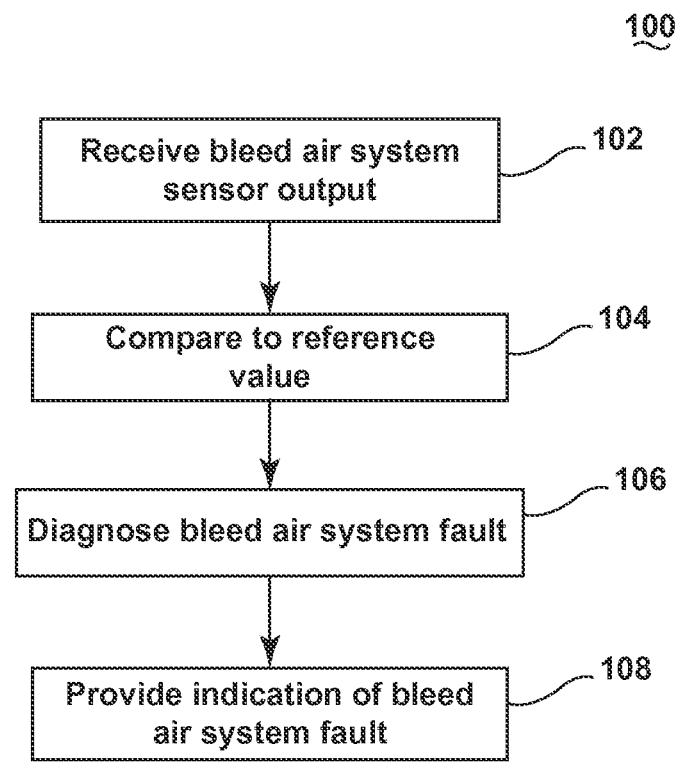
FIG. 3 is a flowchart showing a method of diagnosing a bleed air system fault in an aircraft according to an embodiment of the invention.

In accordance with an embodiment of the invention, FIG. 3 illustrates a method 100, which may be used for diagnosing a fault in the bleed air system 10 such a diagnosed fault may include a diagnosed failure. The method 100 begins at 102 by receiving a sensor signal from at least one of the bleed air system 10 sensors to define a sensor output relevant to a characteristic of the bleed air system 10. This may include sequentially and/or simultaneously receiving data from one or more of the sensors in the aircraft 30 including that a temperature sensor output may be received from the temperature sensor 24, a pressure sensor output indicative of the air pressure of the bleed air system 10 may be received from the pressure sensor 28, and fan speed output indicative of a fan speed of the engine may be received from the fan speed sensor 26. Furthermore, receiving the sensor signal may include receiving multiple sensor outputs and information regarding the settings of the various valves 22.

It is contemplated that the sensor output may include raw data from which a variety of other information may be derived or otherwise extracted to define the sensor output. It will be understood that regardless of whether the sensor output is received directly or derived from received output, the output may be considered to be sensor output.

For example, the sensor output may be aggregated over time to define aggregated sensor data. Aggregating the received sensor output over time may include aggregating the received sensor output over multiple phases of flight and/or over multiple flights. Such aggregated sensor data may include a median value, a running or current median value, or a historical median value. It is also contemplated that aggregating the received sensor output may include aggregating multiple values including a current median value and a historical median value. Such aggregated sensor data may be reset after a maintenance event. By way of non-limiting examples, such aggregated sensor data may include a running historic median pressure value, a running recent median pressure value, a running historic median temperature value, a running recent median temperature value, a historic standard deviation temperature value, a recent standard deviation temperature value, a maximum temperature over a given number of data points, a measure of correlation between a temperature and an engine parameter such as indicated fan speed, etc.

The sensor output may be received once per flight or multiple times per flight. The data may be received during a number of different phases of flight of the aircraft 30. For example, the multiple phases of flight may include takeoff, descent, and the longest cruise segment. For example, the received sensor output may be one of a median sensor output calculated from sensor output received from the multiple phases.

At 104, the sensor output may be compared to a reference value for the sensor output. The reference value may be any suitable reference value related to the sensor output including that the reference value may be a temperature value, a value indicative of a temperature values or pressure values at a specific fan speed, a pressure value, etc. The reference value for the sensor output may also include a historical reference value for the sensor output including for example historical data related to the bleed air system of the aircraft or historical data for multiple other aircraft. Thus, the output signal may be compared to results obtained from previous flights for the same aircraft and against the whole fleet of aircraft. Furthermore, the reference value for the sensor output may include a value that has been determined during flight such as by receiving an output of one of the temperature sensor 24, fan speed sensor 26, and pressure sensor 28. In this manner, it will be understood that the reference value for the sensor output may be defined during operation. For example, the reference value could be a pressure calculated from another engine of the aircraft. Alternatively, the reference values may be stored in one of the database(s) as described above.

In this manner, the sensor output may be compared to a reference value for the sensor output. Any suitable comparison may be made. For example, the comparison may include determining a difference between the sensor output and the reference value. By way of non-limiting example, the comparison may include comparing a recent signal output to a historic value. The comparison may include determining a measure of maximum temperature above a given threshold. The comparison may alternatively include determining a pressure difference between engines on the same aircraft 30. Comparisons may be made on a per flight basis or the data may be processed per individual engine over a series of flights. It is also contemplated that comparisons may be limited to being within various indicated fan speed ranges due to dependency of temperature variation on the indicated fan speed. Comparisons may further measure a change in correlation between two parameters including where the correlation exceeds a given threshold.

At 106, a fault in the bleed air system may be diagnosed based on the comparison at 104. For example, a fault in the bleed air system 10 may be diagnosed when the comparison indicates that the sensor satisfies a predetermined threshold. The term "satisfies" the threshold is used herein to mean that the variation comparison satisfies the predetermined threshold, such as being equal to, less than, or greater than the threshold value. It will be understood that such a determination may easily be altered to be satisfied by a positive/negative comparison or a true/false comparison. For example, a less than threshold value can easily be satisfied by applying a greater than test when the data is numerically inverted. Any number of faults in the bleed air system 10 may be determined By way of non-limiting example, a fault may be diagnosed with a pre-cooler control valve (PCCV) when the comparisons indicate an increasing pre-cooler outlet temperature trend versus historic data and a shift in relationship between pre-cooler outlet temperature and fan speed. Further, a fault may be diagnosed with a PCCV when there is a pneumatic pressure split between engines on the same aircraft, a fault with a pressure regulating shutoff valve (PRSOV) or bleed air regulator may be diagnosed when fluctuating pressures are determined, a fault with a high stage regulator or high stage valve may be diagnosed when a low pressure is determined, however if this is only determined in climb or cruise a fault with the air regulation system may be determined, or a fault with the high stage regulator or high stage valve may be diagnosed when the fan speed is determined to be low. When a low pressure is determined, a fault with the bleed air regulator or PRSOV may be determined, when the fan speed is determined to be high and the pressure is determined to be high, a fault with the high stage regulator or high stage valve may be determined when the engines were determined to be at high power and pressure upstream of the PRSOV is determined to be high. Sensor faults may also be determined by determining a high number of out of range readings or for example via comparisons of recent median temperatures to historic median temperature where other readings were determined to be normal. It will be understood that any number of faults may be predicted based on any number of comparisons. These comparisons may also be used to provide information relating to the severity of the fault.

Further, diagnosing the fault may be based on multiple comparisons. The comparison or combination of comparisons may indicate which sensors, parts or sub-systems are likely to be at fault. For example where a particular valve is indicating it is changing state frequently but all other parameters are normal it is likely to be the sensor determining which state the valve is in that is at fault. A further example may be if pre-cooler inlet pressure is normal but transfer pressure is indicated and some of the parameters indicating leaks in the wing are indicating, then there is likely to be a leak between the pre-cooler and the output to the air conditioning system.

In implementation, the reference values for the sensor output and comparisons may be converted to an algorithm to diagnose faults in the bleed air system 10. Such an algorithm may be converted to a computer program comprising a set of executable instructions, which may be executed by the controller 40 and/or the computer 50. Various other parameters recorded by onboard systems such as altitude, valve settings, etc. may also be utilized by such a computer program to diagnose faults in the bleed air system 10. Alternatively, the computer program may include a model, which may be used to diagnose faults in the bleed air system 10. A model may include the use of reasoning networks, flow charts or decision trees. Diagnosis may be based upon understanding of the system and patterns in the data compared to previous faults. The model may ensure all information available is used and may discount false positives. For example, the model may use knowledge that singular spikes in pressure may be associated with maintenance on the air conditioning system.

At 108, the controller 40 and/or the computer 50 may provide an indication of the fault in the bleed air system 10 diagnosed at 106. The indication may be provided in any suitable manner at any suitable location including in the cockpit 34 and at the ground system 52. For example, the indication may be provided on a primary flight display (PFD) in a cockpit 34 of the aircraft 30. If the controller 40 ran the program, then the suitable indication may be provided on the aircraft 30 and/or may be uploaded to the ground system 52. Alternatively, if the computer 50 ran the program, then the indication may be uploaded or otherwise relayed to the aircraft 30. Alternatively, the indication may be relayed such that it may be provided at another location such as an airline control or flight operations department.

It will be understood that the method of diagnosing a bleed air system fault is flexible and the method illustrated is merely for illustrative purposes. For example, the sequence of steps depicted is for illustrative purposes only, and is not meant to limit the method 100 in any way as it is understood that the steps may proceed in a different logical order or additional or intervening steps may be included without detracting from embodiments of the invention. Further, the fault may be diagnosed when the comparison exceeds a reference value a predetermined number of times and/or over a predetermined number of flights. Further, the fault may be based on derived data such as medians, minima, maximum values, standard deviations, counts above or below thresholds, change of state, correlations, etc. that may be calculated per phases of the flight of the aircraft. Further still, the faults may be determined during particular phases of flight or when certain conditions, such as high fan speeds, are met. For example, data at a certain phases of flight may indicate a particular diagnosis as shown in Table 1 below.

TABLE 1

Exemplary Determined Diagnosis

| Flight phase | Data indication | Manifestation | Diagnosed Part |
| --- | --- | --- | --- |
| Take-off power | Appear normal Pressure upstream of PRSOV is high | Trip (pressure high) | Bleed air regulator, High stage valve, High stage regulator |
| Climb, cruise or descent | Pressure low | Trip (temperature high) | PCCV, PCCV sensor |
| High fan speed | High pressure | Cockpit notification or trip | Bleed air regulator, PRSOV |
| All | Fluctuating pressure | Cockpit notification or trip | Bleed air regulator, PRSOV |
| Climb or cruise | Low pressure | Bleed air regulation issue or not enough cooling air to pre-cooler | PCCV, temperature sensors, bleed air regulator, or PRSOV |
| Low fan speed | Low pressure | Cockpit notification via split/low values visible | High stage (regulator or valve), bleed air regulator, or PRSOV |

Technical effects of the above described embodiments include that data gathered by the aircraft may be utilized to diagnose a bleed air system fault. This reduces maintenance times and the operational impact of faults and issues due to the bleed air system. Particularly there may be a reduction in the time required to diagnose an issue and issues may be diagnosed accurately. This allows for cost savings by reducing maintenance cost, rescheduling cost, and minimizing operational impacts including minimizing the time aircraft are grounded.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of diagnosing a bleed air system fault in an aircraft, comprising:
   receiving a temperature sensor signal from a temperature sensor associated with the bleed air system of an engine of the aircraft, and a fan speed signal indicative of a fan speed of an engine of the aircraft, wherein the temperature sensor signal is indicative of a pre-cooler outlet temperature of the engine;
   receiving a temperature sensor signal from a temperature sensor associated with the bleed air system, and a fan speed signal indicative of a fan speed of an engine of the aircraft;
   comparing the temperature sensor signal and fan speed signal to reference values;
   determining, based on the comparing, an increasing pre-cooler outlet temperature trend versus historic data and a shift in a relationship between pre-cooler outlet temperature and fan speed;
   in response to determining the increasing pre-cooler outlet temperature trend versus historic data and the shift in the relationship between pre-cooler outlet temperature and fan speed, diagnosing a fault in the bleed air system; and
   providing an indication of the diagnosed fault.

2. The method of claim 1 wherein at least one of the temperature sensor signal or fan speed signal is received once per flight.

3. The method of claim 1 wherein providing the indication comprises providing the indication on a primary flight display in a cockpit of the aircraft.

4. The method of claim 1 wherein the fault is diagnosed with a pre-cooler control valve.

5. The method of claim 1 wherein the sensor output is from multiple phases of flight of the aircraft.

6. The method of claim 5 wherein the multiple phases of flight include take-off, descent and cruise.

7. The method of claim 1 wherein the fault is diagnosed when the comparison exceeds the reference value a predetermined number of times over a predetermined number of flights.

8. The method of claim 1 wherein a controller of the aircraft performs the receiving, the comparing, the determining, the diagnosing, and the providing the indication.

* * * * *